US010459206B2

(12) United States Patent
Zeng (10) Patent No.: US 10,459,206 B2
(45) Date of Patent: Oct. 29, 2019

(54) MOBILE TERMINAL (71) Applicant: GUANGDONG OPPO MOBILE TELECOMMUNICATIONS CORP., LTD., Dongguan, Guangdong (CN)

(72) Inventor: Yuanqing Zeng, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 47 days.

(21) Appl. No.: 15/626,860

(22) Filed: Jun. 19, 2017

(65) Prior Publication Data
US 2017/0285309 A1 Oct. 5, 2017

Related U.S. Application Data (63) Continuation of application No. PCT/CN2016/083689, filed on May 27, 2016.

(30) Foreign Application Priority Data

Jun. 30, 2015 (CN) .......................... 2015 1 0381585

(51) Int. Cl.
*H04N 5/225* (2006.01)
*G02B 13/06* (2006.01)
(Continued)

(52) U.S. Cl.
CPC .......... *G02B 13/06* (2013.01); *G02B 13/009* (2013.01); *G03B 11/00* (2013.01); *G03B 13/10* (2013.01);
(Continued)

(58) Field of Classification Search
None
See application file for complete search history.

(56) References Cited

U.S. PATENT DOCUMENTS

2004/0173862 A1* 9/2004 Oohara ................ G02B 6/4249
257/432
2005/0236553 A1* 10/2005 Noto ................ H01L 27/14621
250/208.1
(Continued)

FOREIGN PATENT DOCUMENTS

CN 103685639 A 3/2014
CN 203574741 U 4/2014
(Continued)

OTHER PUBLICATIONS

International Search Report for PCT/CN2016/083689 dated Aug. 23, 2016.

*Primary Examiner* — Twyler L Haskins
*Assistant Examiner* — Dwight Alex C Tejano (57) ABSTRACT A mobile terminal includes a terminal body and a camera module. The terminal body includes a housing and a control module. The housing is provided with a viewfinder window. The camera module includes a lens component and an image sensor. The lens component includes a lens frame, a concave lens, and a convex lens. The image sensor is fixed inside the housing and is located at a side of the convex lens away from the concave lens. The image sensor is electrically connected to the control module so as to control the image sensor using the control module to recognize an object image from outside of the viewfinder window.

13 Claims, 6 Drawing Sheets (51) Int. Cl.

| | |
|---|---|
| *G03B 17/12* | (2006.01) |
| *H04M 1/02* | (2006.01) |
| *G03B 11/00* | (2006.01) |
| *G03B 13/10* | (2006.01) |
| *G03B 13/34* | (2006.01) |
| *G03B 37/00* | (2006.01) |
| *G02B 13/00* | (2006.01) |

(52) U.S. Cl.
CPC ............ *G03B 13/34* (2013.01); *G03B 17/12* (2013.01); *G03B 37/00* (2013.01); *H04M 1/02* (2013.01); *H04N 5/2252* (2013.01); *H04N 5/2254* (2013.01); *H04N 5/2257* (2013.01)

(56) References Cited

U.S. PATENT DOCUMENTS

| | | | |
|---|---|---|---|
| 2007/0154198 A1* | 7/2007 | Oh | G02B 7/102 396/85 |
| 2008/0044172 A1 | 2/2008 | Tang et al. | |
| 2008/0230934 A1* | 9/2008 | Rudmann | H01L 25/50 264/2.7 |
| 2009/0051774 A1 | 2/2009 | Shiraishi | |
| 2010/0079660 A1 | 4/2010 | Ugawa et al. | |
| 2010/0247086 A1* | 9/2010 | Tallaron | G02B 3/14 396/133 |
| 2010/0322607 A1 | 12/2010 | Kuroda et al. | |
| 2013/0120649 A1 | 5/2013 | Shiraishi | |
| 2013/0128369 A1 | 5/2013 | Kim | |
| 2013/0188945 A1* | 7/2013 | Andre | H01L 27/14625 396/505 |
| 2013/0293765 A1* | 11/2013 | Lipson | G03B 3/10 348/345 |
| 2014/0028902 A1* | 1/2014 | Sanford | H04N 5/2256 348/373 |
| 2016/0028930 A1* | 1/2016 | Kim | G03B 3/10 348/208.99 |
| 2016/0358001 A1* | 12/2016 | Chen | G06K 7/10732 |
| 2017/0235095 A1* | 8/2017 | Sekimoto | G02B 7/09 359/824 |

FOREIGN PATENT DOCUMENTS

| | | | |
|---|---|---|---|
| CN | 103777322 A | | 5/2014 |
| CN | 104062737 A | * | 9/2014 |
| CN | 104062737 A | | 9/2014 |
| CN | 104991401 A | | 10/2015 |
| EP | 1748310 A2 | | 1/2007 |
| EP | 2169439 A1 | | 3/2010 |
| JP | 2005122026 A | | 5/2005 |

* cited by examiner

MOBILE TERMINAL

CROSS REFERENCE TO RELATED APPLICATION

This application is a continuation of International Application No. PCT/CN2016/083689, filed on May 27, 2016, which claims priority to Chinese Application No. 201510381585.0, filed Jun. 30, 2015. The entire disclosures of the above applications are incorporated herein by reference.

BACKGROUND

1. Field of the Disclosure

The present disclosure relates to a mobile terminal.

2. Description of the Related Art

With widespread use of mobile phone photography, more and more users are getting used to taking pictures using their phones instead of using cameras. As a result, demands on photographing using mobile phones are increasing. Adjusting a view angle in photographing using traditional mobile phones is carried out by adjusting a distance between lenses and an image sensor. A field of view is determined in such a way. However, the view angle is limited in this way of adjustment. Photographing with a large view angle is not satisfied. A large field of view cannot be obtained especially in a close shot.

SUMMARY

The present disclosure proposes a mobile terminal capable of enlarging a photographic view angle range and improving user experience.

An embodiment of the present disclosure provides a mobile terminal. The mobile terminal includes a housing, a control module accommodated in the housing, and a camera module. The housing is provided with a viewfinder window. The camera module includes a lens component and an image sensor. The lens component includes a lens frame mounted on the housing and disposed relative to the viewfinder window; a convex lens; and a concave lens located between the convex lens and the viewfinder window. The convex lens and the concave lens are fixed at an inner side of the lens frame. A focal length of the convex lens minus a focal length of the concave lens is greater than or equal to a distance from the convex lens to the concave lens. The image sensor is fixed inside the housing and is located at a side of the convex lens away from the concave lens. The image sensor is configured to obtain an object image from outside of the viewfinder window at least using the concave lens and the convex lens. The image sensor electrically is connected to the control module to transmit the obtained object image to the control module for processing the obtained object image.

An embodiment of the present disclosure further provides a mobile terminal. The mobile terminal includes a housing and a camera module. The housing is provided with a viewfinder window. The camera module includes a convex lens; a concave lens, located between the convex lens and the viewfinder window, a focal length of the convex lens minus a focal length of the concave lens being greater than or equal to a distance from the convex lens to the concave lens; an image sensor located at a side of the convex lens away from the concave lens, configured to capture an image; a photographic lens disposed between the image sensor and the convex lens; and a motor, connected to the photographic lens, configured to move the photographic lens between the image sensor and the convex lens within the focal length of the convex lens.

An embodiment of the present disclosure still further provides a camera module. The camera module includes a fixed transparent plate; a convex lens; a concave lens, located between the convex lens and the fixed transparent plate, a focal length of the convex lens minus a focal length of the concave lens being greater than or equal to a distance from the convex lens to the concave lens; an image sensor located at a side of the convex lens away from the concave lens, configured to capture an image; a photographic lens disposed between the image sensor and the convex lens; and a motor, connected to the photographic lens, configured to move the photographic lens between the image sensor and the convex lens within the focal length of the convex lens.

In the mobile terminal of the present disclosure, the concave lens and the convex lens are disposed at an inner side of the viewfinder window, and the convex lens is close to an inner side of the housing relative to the concave lens. The focal length of the convex lens minus the focal length of the concave lens is greater than or equal to the distance from the convex lens to the concave lens. In such a manner, an object image in a shallow depth of field outside the viewfinder window is magnified by the convex lens after passing through the concave lens. In such a manner, the image sensor can obtain a clear object image in a close shot, and thus the mobile terminal can enlarge a photographic view angle range and user experience is improved.

BRIEF DESCRIPTION OF THE DRAWINGS

For explaining the technical schemes used in the conventional skills and the embodiments of the present disclosure more clearly, the drawings to be used in the descriptions on the embodiments or the conventional skills will be briefly introduced in the following. Obviously, the drawings below are only some embodiments of the present disclosure, and those of ordinary skill in the art can further obtain other drawings according to these drawings without making any inventive effort.

DETAILED DESCRIPTION OF THE PREFERRED EMBODIMENTS

The technical solutions in the embodiments of the present disclosure will be clearly and completely described in the following with reference to the accompanying drawings. It is obvious that the embodiments to be described are merely a part rather than all of the embodiments of the present disclosure. All other embodiments obtained by a person of ordinary skill in the art based on the embodiments of the present disclosure without creative efforts shall fall within the protection scope of the present disclosure.

Referring to FIGS. 1 to 4, the present disclosure provides a mobile terminal 1. The mobile terminal 1 may be implemented by a cell phone or a tablet. The mobile terminal 1 includes a terminal body 10 and a camera module 20. The terminal body 10 includes a housing 11 and a control module 12 accommodated in the housing 11. The housing 11 is provided with a viewfinder window 11a. The camera module 20 includes a lens component 21 and an image sensor 22. The lens component 21 includes a lens frame 211, a concave lens 212, and a convex lens 213. The lens frame 211 is mounted on the housing 11 and is disposed relative to the viewfinder window 11a. The concave lens 212 and the concave lens 213 are fixed at an inner side of the lens frame 211. The concave lens 212 is located between the convex lens 213 and the viewfinder window 11a. The focal length of the convex lens 213 minus the focal length of the concave lens 212 is greater than or equal to the distance from the convex lens 213 to the concave lens 212. The image sensor 22 is fixed inside the housing 11 and is located at a side of the convex lens 213 away from the concave lens 212. The image sensor 22 obtains an object image from outside of the viewfinder window 11a through the concave lens 212 and the convex lens 213. The image sensor 22 is electrically connected to the control module 12 so as to control the image sensor 22 by using the control module 12 to recognize the object image from outside of the viewfinder window 11a.

Figure 1:
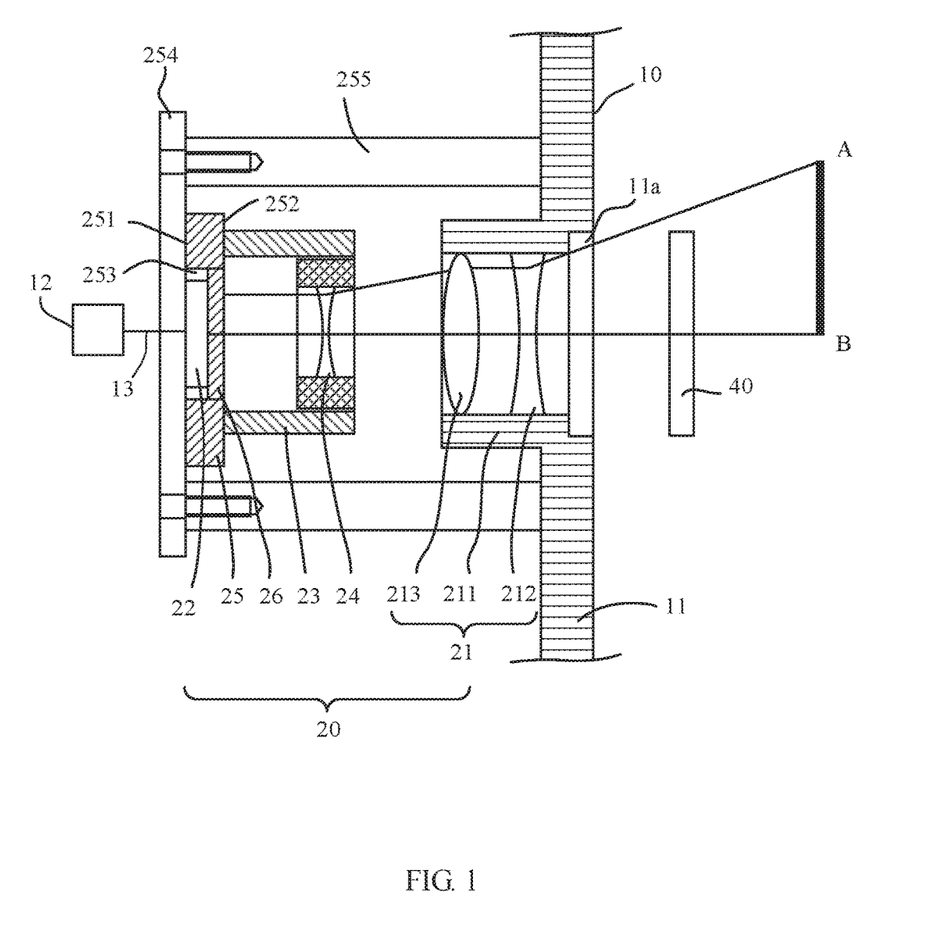
FIG. 1 is a schematic structural diagram showing a mobile terminal in accordance with an embodiment of the present disclosure.

In an embodiment, the terminal body 10 is a body of a cell phone having cell phone functions such as voice communication, music playing, gaming, web surfing, and e-book reading. The control module 10 can be a chip on the system board. The control module 12 can be an assembly of a plurality of chips having various functions. The housing 11 is a case of the cell phone. The housing 11 protects the control module 12 and the camera module 20.

The concave lens 212 and the convex lens 213 are combined. The concave lens 212 scales down the object image in a short distance and the convex lens 213 magnifies the scaled-down object image for the image sensor 22 to recognize.

Image information obtained by the image sensor 22 is transmitted to the control module 12 via a data line 13. The control module 12 processes the image information and then transmits it to a display screen. The image is displayed on the display screen.

Figure 2:
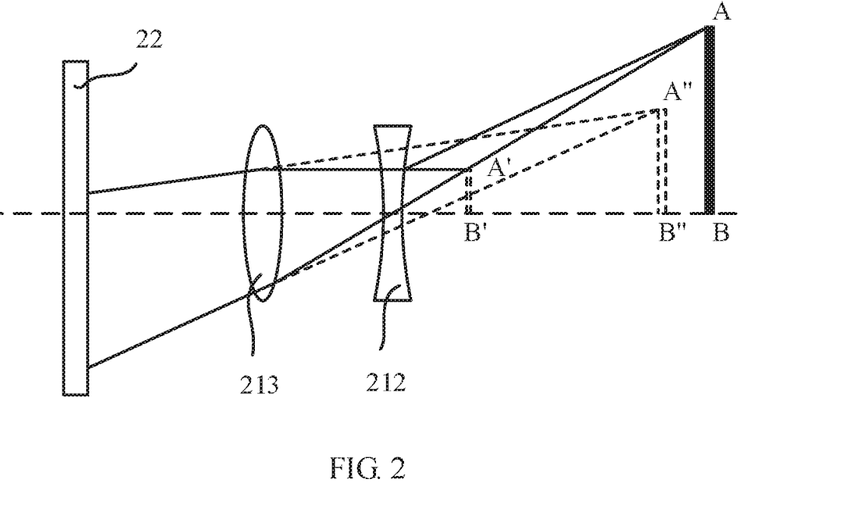
FIG. 2 is a schematic diagram showing a photographic state of the mobile terminal shown in FIG. 1.

Please refer to FIG. 2. The focal length of the concave lens 212 is short, and therefore the concave lens 212 can scale down an object image AB occupied a large space range in a short distance to form an upright scaled-down virtual image A'B'. The focal length of the convex lens 213 minus the focal length of the concave lens 212 is greater than or equal to the distance from the convex lens 213 to the concave lens 212, and therefore the scaled-down virtual image A'B' falls within the focal length of the convex lens 213. The scaled-down virtual image A'B' is magnified by the convex lens 213 to form a virtual image A"B". The image sensor 22 is then used to recognize the magnified virtual image A"B" by the convex lens 213. The mobile terminal 1 provided in the present disclosure can obtain an object image occupied a large space range in a close shot. Compared to the limited view angle of a conventional mobile terminal, the present disclosure can be carried out with a simple structure and enlarge a photographic view angle range.

In the mobile terminal 1 of the present disclosure, the concave lens 212 and the convex lens 213 are disposed at an inner side of the viewfinder window 11a, and the convex lens 213 is close to an inner side of the housing 11 relative to the concave lens 212. The focal length of the convex lens 213 minus the focal length of the concave lens 212 is greater than or equal to the distance from the convex lens 213 to the concave lens 212. In such a manner, an object image in a shallow depth of field outside the viewfinder window 11a is magnified by the convex lens 213 after passing through the concave lens 212. In such a manner, the image sensor 22 can obtain a clear object image in a close shot, and thus the mobile terminal 1 can enlarge a photographic view angle range and user experience is improved.

Figure 5:
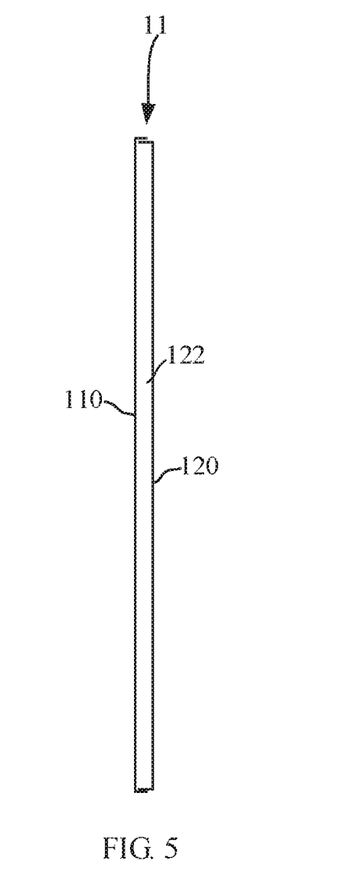
FIG. 5 is a schematic diagram showing a housing of a mobile terminal in accordance with an embodiment of the present disclosure.
Figure 6:
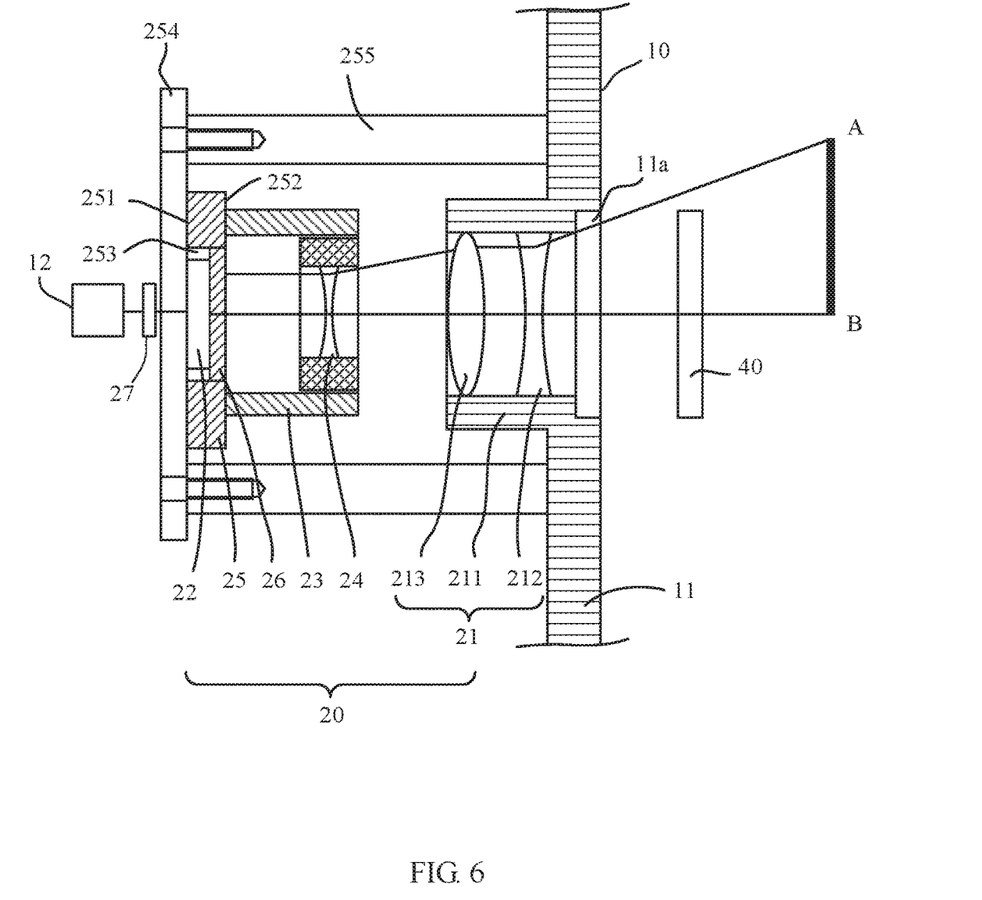
FIG. 6 is a schematic structural diagram showing a mobile terminal in accordance with still another embodiment of the present disclosure.

In at least one embedment, the housing 11 is shaped as a rectangular plate. Referring to FIG. 5, the housing 11 includes a front cover 110 and a rear cover 120. The rear cover 120 is enclosed by the front cover 110. The rear cover 120 has an accommodating chamber 122 facing the front cover 110. The control module 12 and the camera module 20 are all received in the accommodating chamber 122. The front cover 110 covers the accommodating chamber 122. In an embodiment, referring to FIGS. 4 and 5, the mobile terminal 1 of the present disclosure further includes a display module 30. The display module 30 is fixed in the accommodating chamber 122 and is connected to the control module 12. In this way, by using the control module 12, the display module 30 acquires the images captured by the camera module 20. The display module 30 displays the images by use of the front cover 12. The viewfinder window 11a is disposed on the rear cover 120 at a side away from the front cover 110. The viewfinder window 11a is a circular hole so as to facilitate a shot taken by the camera module 20. In other embodiments, the viewfinder window 11a can also be disposed on the front cover 110 so as to carry out obtaining a large range of view angles by the mobile terminal 1 in self portrait shots.

Further, the camera module 20 further includes a voice coil motor 23 and a photographic lens 24 disposed on the voice coil motor 23. The photographic lens 24 is located between the image sensor 22 and the convex lens 213. The voice coil motor 23 adjusts the position of the focus of the photographic lens 24 so as to focus an object image passing through the photographic lens 24 on the image sensor 22.

In an embodiment, the photographic lens 24 is used to guide a divergent beam from the convex lens 213 to form a parallel beam for the image sensor 22 to recognize. The voice coil motor 23 adjusts the position of the photographic lens 24 between the image sensor 22 and the convex lens 213 so as to adjust a guiding mode of the photographic lens 24. In such a manner, it is convenient for the image sensor 22 to obtain a clear object image. In an embodiment, the photographic lens 24 is a concave lens. The distance from the photographic lens 24 to the convex lens 213 is smaller than the focal length of the convex lens 213. The voice coil motor 23 adjusts the photographic lens 24 to move it relative to the convex lens 213 so as to adjust the distance from the photographic lens 24 to the convex lens 213, thereby facilitating the image sensor 22 to obtain a clear object image.

In an embodiment, the lens frame 211 is fixed at an inner side of the viewfinder window 11a. The concave lens 212 and the convex lens 213 are all fixed in the housing 11. In this way, the image sensor 22 is fixed relative to the concave lens 212 and the convex lens 213. The voice coil motor 23 drives the photographic lens 24 to get close to or away from the image sensor 22. That is, the photographic lens 24 is driven to move close to or away from the image sensor 22. By use of the voice coil motor 23, the photographic lens 24 is driven to move to a position within the focal length of the convex lens 213. In such a manner, the divergent beam from the convex lens 213 is transformed into the parallel beam.

Figure 3:
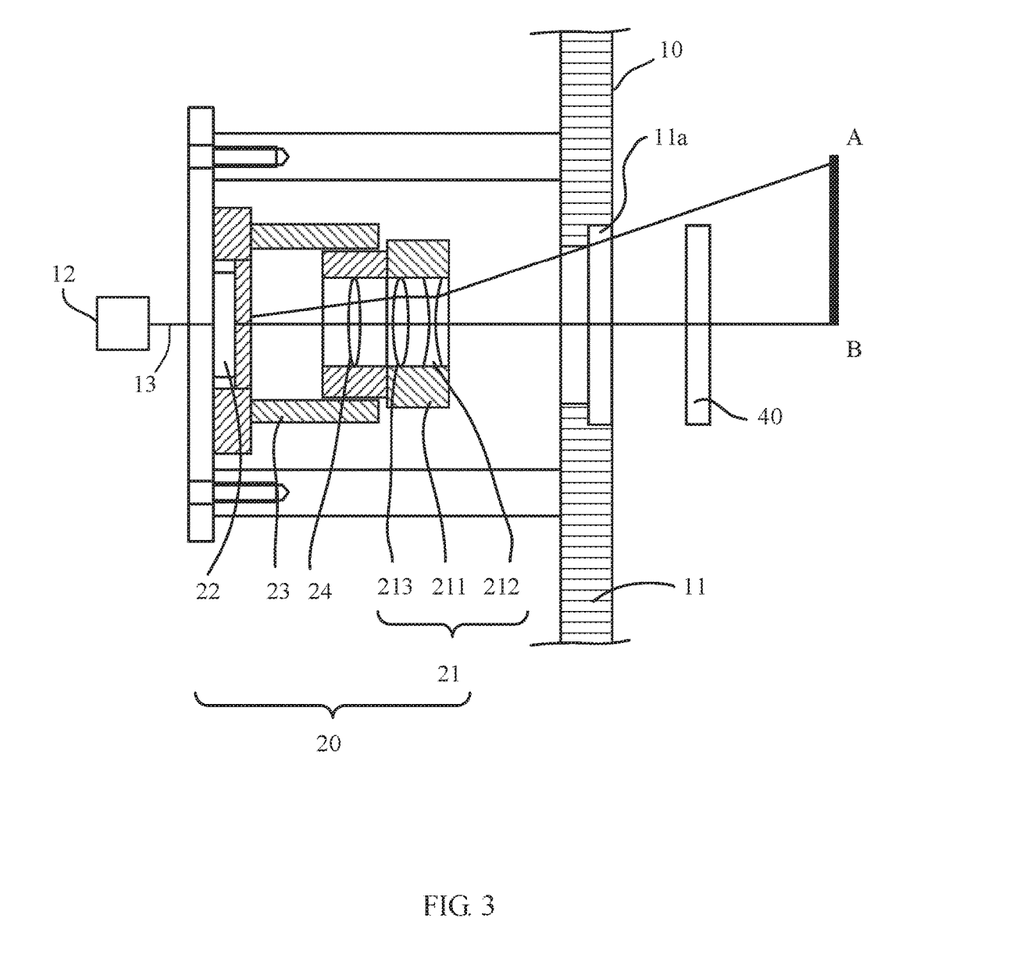
FIG. 3 is a schematic structural diagram showing a mobile terminal in accordance with another embodiment of the present disclosure.
Figure 4:
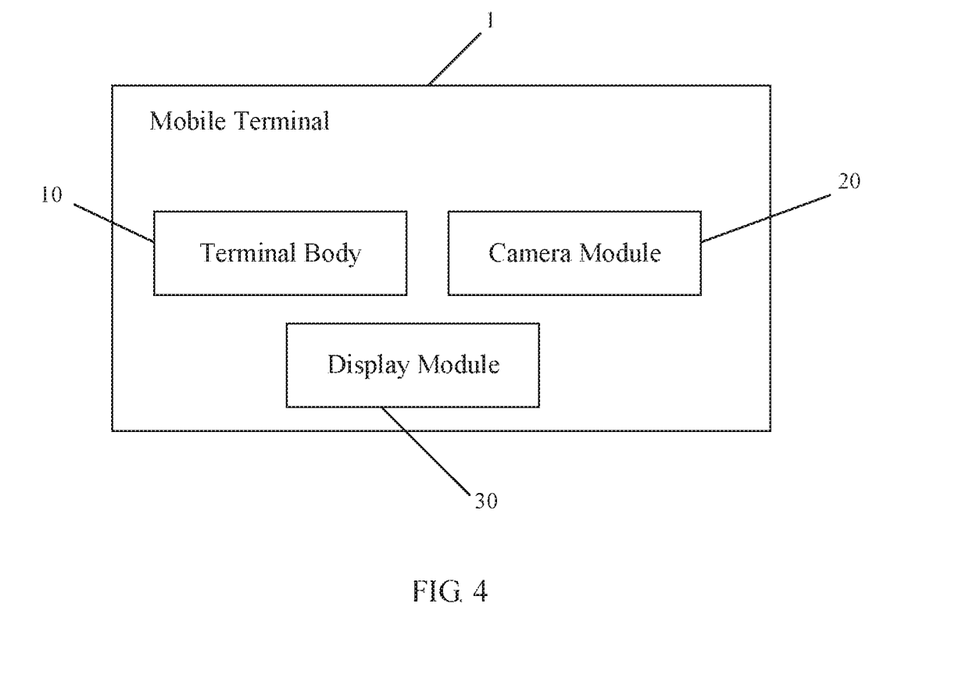
FIG. 4 is a general view of a mobile terminal in accordance with an embodiment of the present disclosure.

Please refer to FIG. 3. In another embodiment, the photographic lens 24 is a convex lens. The photographic lens 24 further scales down the object image passing through the convex lens 213 so as to focus on the image sensor 22. In such a manner, the camera module 20 can photograph at a large view angle range. In an embodiment, the distance from the photographic lens 24 to the convex lens 213 is smaller than the focal length of the convex lens 213. In an embodiment, the lens frame 211 is mounted on the voice coil motor 23. The voice coil motor 23 adjusts the positions of the concave lens 212 and the convex lens 213 along with the photographic lens 24 so as to move relative to the image sensor 22. It is convenient to adjust the distance from the photographic lens 24 to the image sensor 22 and focus the scaled-down object image on the image sensor 22. In such a manner, photography performance of the mobile terminal is improved.

Further, the camera module 20 further includes a base 25, which is fixed in the housing 11 and is disposed relative to the viewfinder window 11a. The image sensor 22 and the voice coil motor 23 are all fixed at one side of the base 25 facing the viewfinder window 11a.

In an embodiment, the base 25 is a frame. The base 25 includes a top face 251 and a bottom face 252 opposite to each other. The base 25 has an installation hole 253 penetrating the top face 251 and the bottom face 252. The installation hole 253 faces the viewfinder window 11a. The image sensor 22 is fastened into the installation hole 253 and is close to the top face 251. The bottom of the voice coil motor 23 is fixed on the top face 251. The voice coil motor 23 covers the image sensor 22 such that a dark room is formed for the image sensor 22. In an embodiment, the bottom face 252 of the base 25 is fixed on a circuit board 254. The circuit board 254 is fixed at the inner side of the housing 11 by using a stud 255. Therefore, the voice coil motor 23 can get electricity from the circuit board via the base 25 so as to drive the photographic lens 24. Also, the circuit board 254 covers the installation hole 253 of the base 25. In an aspect, this facilitates fastening the image sensor 22. In another aspect, this can further seal the image sensor 22 so as to protect the image sensor 22.

Further, the camera module 20 further includes an optical filter 26, which is fastened to the base 25 and is located between the image sensor 22 and the photographic lens 24. In an embodiment, the optical filter 26 covers the installation hole 253 at one side of the photographic lens 24. The optical filter 26 is used to filter light rays of an object image from the photographic lens 24 such that light rays of the object image captured by the camera module 20 is softer and photography performance of the mobile terminal 1 is improved.

Further, the camera module 20 further includes a flexible circuit board 27. The flexible circuit board 27 is connected between the image sensor 22 and the control module 12. The flexible circuit board 27 is used to transmit the image information data captured by the image sensor 22 to the control module 12 so as to facilitate processing the information data by the control module 12 and transforming that into visible image information. The flexible circuit board 27 is detachably connected to the control module 12 so as to facilitate the detachment and maintenance of the camera module 20. In such a manner, the life cycle of the mobile terminal 1 is increased.

Further, the mobile terminal 1 includes a transparent cover 40, which covers the viewfinder window 11a. In an embodiment, the transparent cover 40 is implemented by a transparent glass member. The transparent cover 40 is inlaid at an outer side of the viewfinder window 11a. The transparent cover 40 is used to protect the camera module 20 so as to prevent dust and grains from entering the housing 11 and thus increase the life cycle of the mobile terminal 1. The transparent cover 40 can also be implemented by a convex lens for enlarging the view angle of the mobile terminal 1.

In the mobile terminal 1 of the present disclosure, the concave lens 212 and the convex lens 213 are disposed at an inner side of the viewfinder window 11a, and the convex lens 213 is close to an inner side of the housing 11 relative to the concave lens 212. The focal length of the convex lens 213 minus the focal length of the concave lens 212 is greater than or equal to the distance from the convex lens 213 to the concave lens 212. In such a manner, an object image in a shallow depth of field outside the viewfinder window 11a is magnified by the convex lens 213 after passing through the concave lens 212. In such a manner, the image sensor 22 can obtain a clear object image in a close shot, and thus the mobile terminal 1 can enlarge a photographic view angle range and user experience is improved.

What is said above are only preferred examples of present invention, not intended to limit the present invention, any modifications, equivalent substitutions and improvements etc. made within the spirit and principle of the present invention, should be included in the protection range of the present invention.

What is claimed is:

1. A mobile terminal, comprising a housing, a control module accommodated in the housing, and a camera module, the housing provided with a viewfinder window, the camera module comprising:
   a lens component, comprising:
      a lens frame mounted on the housing and disposed relative to the viewfinder window;
      a convex lens; and
      a concave lens located between the convex lens and the viewfinder window, the convex lens and the concave lens fixed at an inner side of the lens frame, a focal length of the convex lens minus a focal length of the concave lens being greater than or equal to a distance from the convex lens to the concave lens;
   the camera module further comprising:
   an image sensor fixed inside the housing and located at a side of the convex lens away from the concave lens, the image sensor being configured to obtain an object image from outside of the viewfinder window at least using the concave lens and the convex lens, the image sensor electrically connected to the control module to transmit the obtained object image to the control module for processing the obtained object image,
   one voice coil motor; and
   a photographic lens disposed on the voice coil motor, the photographic lens located between the image sensor and the convex lens, the voice coil motor configured to adjust a position of a focus of the photographic lens to focus the object image from the photographic lens on the image sensor,
   wherein the lens frame is mounted on the voice coil motor and is driven by the voice coil motor to move relative to the image sensor.

2. The mobile terminal according to claim 1, wherein the camera module further comprises:
   a base, fixed in the housing and disposed relative to the viewfinder window, the image sensor and the voice coil motor fixed at one side of the base facing the viewfinder window, the base having an installation hole, the image sensor fastened into the installation hole, the voice coil motor covering the image sensor.

3. The mobile terminal according to claim 2, wherein the camera module further comprises an optical filter, which is fastened to the base and is located between the image sensor and the photographic lens.

4. The mobile terminal according to claim 1, wherein the camera module further comprises a flexible circuit board, which is connected between the image sensor and the control module.

5. The mobile terminal according to claim 1, wherein the housing comprises a front cover and a rear cover opposite to each other, the rear cover is enclosed by the front cover, the control module and the camera module are disposed between the front cover and the rear cover, and the viewfinder window is disposed on the rear cover at a side away from the front cover.

6. A mobile terminal, comprising a housing and a camera module, the housing provided with a viewfinder window, the camera module comprising:
a convex lens;
a concave lens, located between the convex lens and the viewfinder window, a focal length of the convex lens minus a focal length of the concave lens being greater than or equal to a distance from the convex lens to the concave lens;
an image sensor located at a side of the convex lens away from the concave lens, configured to capture an image;
a photographic lens disposed between the image sensor and the convex lens;
one motor, connected to the photographic lens, configured to move the photographic lens between the image sensor and the convex lens within the focal length of the convex lens; and
a lens frame provided for the convex lens and the concave lens to mount on, the lens frame connected to the motor and driven by the motor to move together with the photographic lens.

7. The mobile terminal according to claim 6, wherein the motor is configured further to adjust a position of a focus of the photographic lens to focus the image from the photographic lens on the image sensor.

8. The mobile terminal according to claim 6, wherein an image from the viewfinder window is scaled down by the concave lens, magnified by the convex lens, and transformed into parallel beams by the photographic lens.

9. The mobile terminal according to claim 6, wherein the camera module further comprises:
a base, provided for the image sensor and the motor to be fixed at one side of the base, the base having an installation hole, the image sensor fastened into the installation hole, the motor together with the photographic lens covering the image sensor.

10. A camera module comprising:
a fixed transparent plate;
a convex lens;
a concave lens, located between the convex lens and the fixed transparent plate, a focal length of the convex lens minus a focal length of the concave lens being greater than or equal to a distance from the convex lens to the concave lens;
an image sensor located at a side of the convex lens away from the concave lens, configured to capture an image;
a photographic lens disposed between the image sensor and the convex lens;
one motor, connected to the photographic lens, configured to move the photographic lens between the image sensor and the convex lens within the focal length of the convex lens; and
a lens frame provided for the convex lens and the concave lens to mount on, the lens frame connected to the motor and driven by the motor to move together with the photographic lens.

11. The camera module according to claim 10, wherein the motor is configured further to adjust a position of a focus of the photographic lens to focus the image from the photographic lens on the image sensor.

12. The camera module according to claim 10, wherein an image from the fixed transparent plate is scaled down by the concave lens, magnified by the convex lens, and transformed into parallel beams by the photographic lens.

13. The camera module according to claim 10, further comprising:
a base, provided for the image sensor and the motor to be fixed at one side of the base, the base having an installation hole, the image sensor fastened into the installation hole, the motor together with the photographic lens covering the image sensor.

* * * * *